United States Patent [19]

Krieger et al.

[11] 3,929,833
[45] Dec. 30, 1975

[54] ORGANIC COMPOUNDS

[75] Inventors: Manfred Krieger, Pratteln; Rudolf Süess, Bettingen, both of Switzerland

[73] Assignee: Sandoz Ltd., (Sandoz AG), Basel, Switzerland

[22] Filed: May 9, 1974

[21] Appl. No.: 468,378

Related U.S. Application Data

[63] Continuation of Ser. No. 193,165, Oct. 27, 1971, abandoned.

[30] Foreign Application Priority Data

Oct. 30, 1970 Switzerland.................... 16064/70
July 6, 1971 Switzerland...................... 9888/71

[52] U.S. Cl. ....... 260/332.2 C; 260/473 S; 424/275
[51] Int. Cl.² ........................................ C07D 333/24
[58] Field of Search... 260/332.2 C, 332.2 A, 473 S, 260/521 R, 521 A

[56] References Cited
UNITED STATES PATENTS

| | | | |
|---|---|---|---|
| 3,449,368 | 6/1969 | Shen................ | 260/332.2 |
| 3,558,641 | 1/1971 | Sarett................ | 260/295 |
| 3,560,525 | 2/1971 | Kaltenbronn........ | 260/332.2 |
| 3,644,399 | 2/1972 | Brown................ | 260/326.3 |
| 3,692,821 | 9/1972 | Sarett................ | 260/473 R |

OTHER PUBLICATIONS
Courtin, et al., Helv. Chim. Acta 3 (1965) No. 66–67, pp. 617–625; Chem. Abstracts, 63: 2885 (8–1965).

*Primary Examiner*—James O. Thomas, Jr.
*Assistant Examiner*—A. Siegel
*Attorney, Agent, or Firm*—Gerald D. Sharkin; Robert S. Honor

[57] ABSTRACT

The invention provides thiophenecarboxylic acid derivatives of the formula:

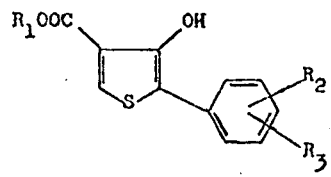

wherein
  $R_1$ is hydrogen or alkyl of 1 to 4 carbon atoms,
  $R_2$ is hydrogen, chlorine, or alkyl or alkoxy of 1 to 3 carbon atoms, and
  $R_3$ is hydrogen, chlorine, bromine, or alkyl or alkoxy of 1 to 3 carbon atoms, or, when $R_2$ denotes hydrogen, may also be fluorine or trifluoromethyl,
and when $R_1$ is hydrogen, pharmaceutically acceptable salts thereof.

The compounds are useful antiphlogistics and analgesics.

4 Claims, No Drawings

ORGANIC COMPOUNDS

This is a continuation of application Ser. No. 193,165 filed Oct. 27, 1971, now abandoned.

This invention relates to thiophenecarboxylic acid derivatives.

In accordance with the invention there are provided new compounds of formula I,

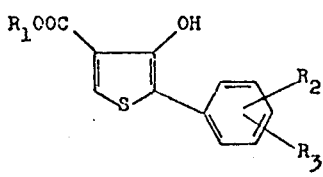

I wherein
$R_1$ is hydrogen or alkyl of 1 to 4 carbon atoms,
$R_2$ is hydrogen, chlorine, or alkyl or alkoxy of 1 to 3 carbon atoms, and
$R_3$ is hydrogen, chlorine, bromine, or alkyl or alkoxy of 1 to 3 carbon atoms, or, when $R_2$ denotes hydrogen, may also be fluorine or trifluoromethyl,
and, when $R_1$ is hydrogen, salts thereof.

Further, in accordance with the invention a compound of formula I may be obtained by a process comprising a. oxidizing a compound of formula II,

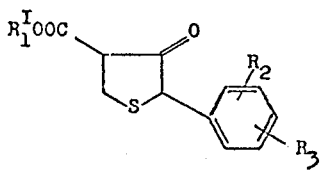

II wherein
$R_1'$ is alkyl of 1 to 4 carbon atoms, and
$R_2$ and $R_3$ are as defined above,
to produce a compound of formula Ia,

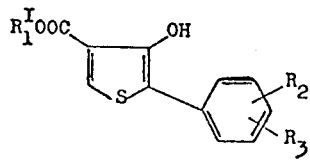

Ia wherein $R_1'$, $R_2$ and $R_3$ are as defined above, or b. hydrolyzing a compound of formula Ia, to produce a compound of formula Ib,

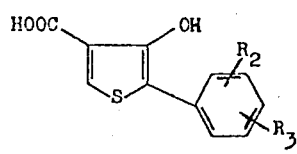

Ib wherein
$R_2$ and $R_3$ are as defined above, and, where a salt is required, basifying the resulting compound of formula Ib.

When the substituent $R_1$ is alkyl, this is preferably methyl or ethyl.

The alkyl or alkoxy groups represented by the symbols $R_2$ and $R_3$ especially denote methyl or methoxy.

The oxidation of a compound of formula II in process variant (a) is conveniently effected in an inert polar solvent, e.g. a lower aliphatic alcohol such as ethanol. In such a solvent a compound of formula II is probably partially present in the form of a compound of formula IIa,

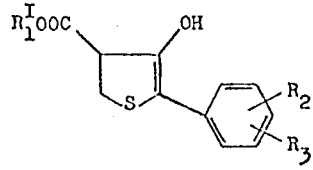

IIa wherein
$R_1'$, $R_2$ and $R_3$ are as defined above.

Suitable oxidizing agents include atmospheric oxygen, hydrogen peroxide, chlorine, bromosuccinimide, manganese dioxide, potassium permanganate and lead dioxide.

The hydrolysis of a compound of formula Ia in process variant (b) is carried out in conventional manner and may, for example, be effected in the presence of a base, e.g. an alkali metal or alkaline earth metal hydroxide, or in the presence of an acid catalyst, e.g. hydrochloric or sulphuric acid. Reaction temperatures are suitably from room temperature to 100°C, and reaction times are of the order of 1 to 50 hours.

The compounds of formula I may be isolated from the reaction mixture and purified in known manner and, if desired, the compounds of formula Ib may be isolated or converted into the form of a salt.

The compounds of formula II, required as starting materials, may, for example, be obtained by cyclizing a compound of formula III,

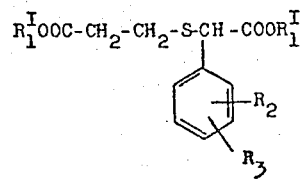

III wherein
$R_1'$, $R_2$ and $R_3$ are as defined above, in conventional manner.

The compounds of formula III may, for example, be produced by reacting a β-mercaptopropionic acid alkyl ester of formula IV, $R_1'OOC-CH_2-CH_2-SH$ 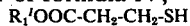 IV wherein
$R_1'$ is as defined above,
with a compound of formula V,

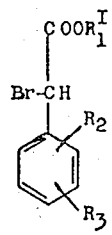

V wherein
R$_1'$, R$_2$ and R$_3$ are as defined above,
in the presence of a basic condensation agent, e.g. an alkali metal alcoholate, in an inert organic solvent.

The compounds of formula V may, for example, be obtained by reacting a compound of formula VI,

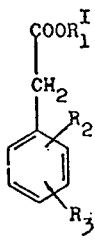
VI wherein
R$_1'$, R$_2$ and R$_3$ are as defined above,
with bromosuccinimide.

Insofar as the production of the starting materials is not particularly described, these are known or may be produced in accordance with known processes, or in a manner analogous to the processes described herein or to known processes.

The compounds of formula I and pharmaceutically acceptable salts of compounds of formula Ib are useful because they possess pharmacological activity in animals. In particular, the compounds are useful as antiphlogistics or as agents for the inhibition of exudation in inflammation or edemas, as indicated by the carrageen edema test of the rat paw, and the granuloma cyst tests in the rat.

For the above mentioned use, the dosage administered will naturally vary depending on the compound employed, the mode of administration and treatment desired. However, in general satisfactory results are obtained when administered at a daily dosage of from about 0.7 to 100 mg/kg animal body weight, conveniently given in divided doses 2 to 3 times a day, or in sustained release form. For the larger mammals, the total daily dosage is in the range of from about 50 to 500 mg, and dosage forms suitable for oral administration comprise from about 16 to 250 mg of the compound admixed with a solid or liquid pharmaceutical carrier or diluent.

The compounds are also useful as analgesics as indicated in mice by the hot plate test, and the tail pinch test, and the inhibition of the phenylbenzoquinone syndrome. For such use, the dosage will of course vary depending upon the compound employed, mode of administration and treatment desired. However, in general satisfactory results are obtained when administered at a daily dosage of from about 3 to 100 mg/kg animal body weight, conveniently given in divided doses 2 to 3 times a day, or in sustained release form. For the larger mammals, the total daily dosage is in the range of from about 200 to 500 mg, and dosage forms suitable for oral administration comprise from about 65 to 250 mg of the compound admixed with a solid or liquid pharmaceutical carrier or diluent.

The compounds of formula Ib may be administered in the form of their pharmaceutically acceptable salts. Such salts include the alkali metal salts, such as the sodium or potassium salt, ammonium salts, and non-toxic alkaline earth metal salts, such as the calcium salt.

The compounds of formula I or the pharmaceutically acceptable salts of the compounds of formula Ib may be used as medicaments on their own or in the form of appropriate medicinal preparations, e.g. tablets, dragees, capsules, granules, suppositories or injectable solutions or suspensions, for enteral or parenteral administration. Aside from the usual inorganic or organic, pharmaceutically acceptable adjuvants, e.g. lactose, starch, talc, stearic acid, water, alcohols, natural or hardened oils and waxes, these preparations may also contain suitable preserving, stabilizing or wetting agents, solubilizers, sweetening or colouring substances and flavourings.

In the following non-limitative Examples all temperatures are indicated in degrees Centigrade and are uncorrected.

EXAMPLE 1

3-Hydroxy-2-phenyl-4-thiophenecarboxylic acid ethyl ester [process variant (a)]

1300 cc of a 40 % aqueous solution of hydrogen peroxide are added dropwise at 60° over a period of 2 hours, while stirring, to 650 g of tetrahydro-3-oxo-2-phenyl-4-thiophenecarboxylic acid ethyl ester, dissolved in a 10-fold quantity of ethanol. The reaction solution is cooled to room temperature and filtered. 3-Hydroxy-2-phenyl-4-thiophenecarboxylic acid ethyl ester has a M.P. of 83°–86° after recrystallization from ether/petroleum ether.

The tetrahydro-3-oxo-2-phenyl-4-thiophenecarboxylic acid ethyl ester, required as starting material, may be obtained as follows:

16.7 g of sodium are added portionwise with heating to 400 cc of absolute ethanol in an atmosphere of nitrogen. After the material dissolves completely, the solution is stirred for a further 30 minutes, the solvent is then removed by evaporation in a vacuum, 100 cc amounts of toluene are added twice and the solution is again evaporated to dryness. The dry reaction product is suspended in 400 cc of toluene in an atmosphere of nitrogen, the suspension is cooled to 5°, and a solution of 10 g of α-[2-(carbethoxy)ethylthio]-4-phenylacetic acid ethyl ester in 600 cc of toluene is added dropwise over a period of 15 minutes. The reaction mixture is stirred at 60° for 2 hours, is then cooled to room temperature, the pH of the same is adjusted to 3 and the toluene constituent is separated. The aqueous phase is again extracted twice with toluene, and the combined toluene constituents are evaporated to dryness. M.P. 68°–72°.

EXAMPLE 2

3-Hydroxy-2-phenyl-4-thiophenecarboxylic acid [process variant b)]

500 g of 3-hydroxy-2-phenyl-4-thiophenecarboxylic acid ethyl ester are added to a mixture of 1000 cc of a 30% caustic soda solution and 200 cc of ethanol while stirring and cooling. The reaction mixture is boiled under reflux for 90 minutes, and the ethanol is subsequently evaporated in a vacuum. The reaction mixture is rendered acid to Congo red with an excess of concentrated sulphuric acid while cooling, is allowed to crystallize overnight in a refrigerator and is filtered. 3-Hydroxy-2-phenyl-4-thiophenecarboxylic acid has a M.P. of 186°–190° after recrystallization from ether/petroleum ether.

EXAMPLE 3

3-Hydroxy-2-(4-methoxyphenyl)-4-thiophenecarboxylic acid ethyl ester [process variant a)]

264 g of tetrahydro-2-(4-methoxyphenyl)-3-oxo-4-thiophenecarboxylic acid ethyl ester are suspended in 700 cc of ethanol at 60°, and 300 cc of 30% hydrogen peroxide are added dropwise while stirring over a period of 30 minutes. All the material dissolves with an exothermic reaction, and the solution is subsequently allowed to cool; this is finally stirred at 0° for 30 minutes, and the precipitated crude product is filtered off. 3-Hydroxy-2-(4-methoxyphenyl)-4-thiophenecarboxylic acid ethyl ester has a M.P. of 80°–84° after recrystallization from ethanol.

The tetrahydro-2-(4-methoxyphenyl)-3-oxo-4-thiophenecarboxylic acid ethyl ester, required as starting material, is produced as follows:

a. 197 g of β-mercaptopropionic acid ethyl ester are added dropwise at room temperature over a period of 45 minutes to 44 g of sodium hydride in 1.75 liters of toluene. The reaction mixture is subsequently heated to 60° for 1 hour, is cooled, and 500 g of α-bromo-p-methoxyphenylacetic acid ethyl ester are added dropwise. The mixture is then stirred at room temperature for 24 hours, is washed with water, dried over magnesium sulphate and evaporated to dryness. The resulting oily, crude α[2-(carbethoxy)ethylthio]-4-methoxyphenylacetic acid ethyl ester is used for the next reaction stage without further purification.

b. 187 g of freshly prepared sodium ethylate are reduced to a paste with 1.3 liters of toluene in a sulphonating flask, and 403 g of crude α-[2-(carbethoxy)ethylthio]-4-methoxyphenylacetic acid ethyl ester, dissolved in 200 cc of toluene, are added dropwise over a period of 60 minutes. The reaction mixture is stirred at room temperature for 1 hour, is heated to 60° for 90 minutes, is cooled and poured on 1.5 liters of 2 N sulphuric acid mixed with ice. The organic phase is successively extracted with water, aqueous sodium hydrogen carbonate solution and water, and the toluene layer is dried over magnesium sulphate and concentrated by evaporation. Tetrahydro-2-(4-methoxyphenyl)-3-oxo-4-thiophenecarboxylic acid ethyl ester is obtained as a dark, oily residue which crystallizes after dissolving in a small amount of ethanol. M.P. 77°–80°.

EXAMPLE 4

2-(4-Chlorophenyl)-3-hydroxy-4-thiophenecarboxylic acid ethyl ester [process variant a)]

1 liter of 30% hydrogen peroxide is added to a suspension of 500 g of 2-(4-chlorophenyl)tetrahydro-3-oxo-4-thiophenecarboxylic acid ethyl ester in 4 liters of alcohol at 60° over a period of 90 minutes. The material dissolves completely with the exothermic reaction, whereupon 2-(4-chlorophenyl)-3-hydroxy-4-thiophenecarboxylic acid ethyl ester commences to crystallize. The mixture is allowed to cool, is finally stirred at 0° for half an hour and is filtered. 2-(4-Chlorophenyl)-3-hydroxy-4-thiophenecarboxylic acid ethyl ester has a M.P. of 91°–93° after recrystallization from ethanol.

The 2-(4-chlorophenyl)tetrahydro-3-oxo-4-thiophenecarboxylic acid ethyl ester, required as starting material, is produced as follows:

a. 500 g of β-mercaptopropionic acid ethyl ester are added dropwise to a solution of sodium ethylate in alcohol, produced from 86 g of sodium and 2 liters of ethanol. The reaction solution is heated to 50° for a short period, is cooled to 5°, and 1120 g of α-bromo-4-chlorophenylacetic acid ethyl ester, diluted with 1000 cc of ethanol, are allowed to flow into the solution at this temperature over a period of 1 hour. The reaction mixture is then boiled under reflux for 1 hour, the alcohol is removed by evaporation at reduced pressure, and the resulting residue in the flask is divided between water and ether. The ethereal layer is washed with saturated sodium chloride solution, dried over magnesium sulphate and concentrated by evaporation. The resulting oily α-[2-(carbethoxy)ethylthio]-4-chlorophenylacetic acid ethyl ester is used for the subsequent cyclization without further purification.

b. 490 g of freshly prepared sodium ethylate are reduced to a paste with 5 liters of toluene in a sulphonating flask, and 1100 g of crude α-[2-(carbethoxy)ethylthio]-4-chlorophenylacetic acid ethyl ester, dissolved in 500 cc of toluene, are added dropwise over a period of 2 hours. The reaction mixture is stirred at room temperature for 1 hour, is heated to 60° for 90 minutes, is cooled and poured on a mixture of ice and 3 liters of 3 N sulphuric acid. The organic phase is successively extracted with water, aqueous sodium hydrogen carbonate solution and water, and the toluene layer is dried over magnesium sulphate and concentrated by evaporation. The resulting 2-(4-chlorophenyl)tetrahydro-3-oxo-4-thiophenecarboxylic acid ethyl ester crystallizes partially and is recrystallized from a small amount of ethanol. M.P. 86°.

EXAMPLE 5

2-(4-Fluorophenyl)-3-hydroxy-4-thiophenecarboxylic acid ethyl ester [process variant a)]

16 g of 2-(4-fluorophenyl)tetrahydro-3-oxo-4-thiophene-carboxylic acid ethyl ester are suspended in 130 cc of ethanol and treated with 35 cc of 40% hydrogen peroxide for 2 hours. The reaction mixture is allowed to stand at room temperature for 12 hours and filtration and recrystallization from ether/petroleum ether are effected thereafter. The resulting 2-(4-fluorophenyl)-3-hydroxy-4-thiophenecarboxylic acid ethyl ester has a M.P. of 90° (decomp.).

The 2-(4-fluorophenyl)tetrahydro-3-oxo-4-thiophenecarboxylic acid ethyl ester, required as starting material, is produced as follows:

a. 52.5 g of 4-fluorophenylacetic acid ethyl ester, 51.0 g of N-bromosuccinimide and 0.5 g of dibenzoyl peroxide are boiled under reflux in 300 cc of carbon tetrachloride for 16 hours. The reaction mixture is cooled, and the precipitated succinimide is filtered off, the filtrate is washed with water and dried over magnesium sulphate, and after evaporating the solvent the resulting α-bromo-4-fluorophenylacetic acid ethyl ester is distilled in a Hickmann flask. B.P. 92°/0.2 mm of Hg.

b. 5.5 g of sodium metal are dissolved in 300 cc of ethanol in a stirring apparatus. The solution is then cooled to 5° and 32.0 g of β-mercaptopropionic acid ethyl ester are allowed to flow into the solution. 62 g of α-bromo-4-fluorophenylacetic acid ethyl ester are subsequently added dropwise at this temperature, whereupon the reaction solution is boiled under reflux for 1 hour. The alcohol is then removed by evaporation and the resulting oil is divided between water and ether. The ethereal solution is washed with saturated sodium hydrogen carbonate solution and water, is dried over magnesium sulphate and concentrated by evaporation. The resulting α-[2-(carbethoxy)ethylthio]-4-fluorophenylacetic acid ethyl ester is distilled in a Hickmann flask. B.P. 156°/0.1 mm of Hg.

c. 15 g of freshly prepared sodium ethylate are suspended in 300 cc of toluene in a stirring apparatus, and a solution of 31 g of α-[2-(carbethoxy)ethylthio]-4-fluorophenylacetic acid ethyl ester in 50 cc of toluene is added dropwise. The reaction mixture is then heated to 60° for 2 hours, whereby a clear solution results. Cooling to room temperature is effected, and the reaction product is poured on a mixture of ice and hydrochloric acid. The toluene layer is separated, dried over magnesium sulphate and concentrated by evaporation. The resulting crude, oily 2-(4-fluorophenyl)tetrahydro-3-oxo-4-thiophenecarboxylic acid ethyl ester crystallizes after the addition of alcohol. It has a M.P. of 70°–72° (decomp.) after recrystallization from ethanol.

EXAMPLE 6

2-(3-Chlorophenyl)-3-hydroxy-4-thiophenecarboxylic acid ethyl ester [process variant a)]

315 g of crude 2-(3-chlorophenyl)tetrahydro-3-oxo-4-thiophenecarboxylic acid ethyl ester are added to 500 cc of ethanol, and 400 cc of 40% hydrogen superoxide are added dropwise at a temperature of 60°, whereby the temperature is kept at 60° by occasional cooling. The mixture is stirred at 60° for a further hour, is cooled in an ice bath, is diluted by the addition of two liters of water, the resulting oil is extracted with benzene and the benzene layer is dried over magnesium sulphate and evaporated to dryness. The resulting 2-(3-chlorophenyl)-3-hydroxy-4-thiophenecarboxylic acid ethyl ester is recrystallized from methanol. M.P. 84°–87°.

The 2-(3-chlorophenyl)tetrahydro-3-oxo-4-thiophenecarboxylic acid ethyl ester, required as starting material, may be obtained as follows:

a. 58 g of a 50% sodium hydride dispersion in 500 cc of toluene are placed in a stirring apparatus under an atmosphere of nitrogen, and 160.0 g of β-mercaptopropionic acid ethyl ester are added dropwise at 60° over a period of 90 minutes. Stirring is effected for 30 minutes, and a solution of 330 g of α-bromo-3-chlorophenylacetic acid ethyl ester in 500 cc of toluene is added dropwise to the sodium salt which has been cooled to 25°. Stirring is effected at room temperature for 18 hours, and the reaction mixture is extracted with water while cooling with ice. The toluene layer is dried over magnesium sulphate, the solvent is evaporated, and the resulting α-[2-(carbethoxy)ethylthio]-3-chlorophenylacetic acid ethyl ester, a yellow viscous oil, is used for the next reaction without further purification.

b. Sodium ethylate is produced from 55 g of sodium and an excess of ethanol, the solution is evaporated to dryness, and the residue is evaporated once with absolute toluene. The resulting sodium alcoholate is suspended in 1 liter of toluene in a sulphonating flask, and 358 g of crude α-[2-(carbethoxy)ethylthio]-3-chlorophenylacetic acid ethyl ester, dissolved in 500 cc of toluene, are added dropwise over a period of 60 minutes. The reaction mixture is then stirred at room temperature for 1 hour and is boiled under reflux for 2 hours. The reaction mixture is cooled and poured on a mixture of ice and 1 liter of 2 N sulphuric acid. The organic phase is successively washed out with water, aqueous sodium hydrogen carbonate solution and again with water, and the toluene layer is dried over magnesium sulphate and concentrated by evaporation. The resulting 2-(3-chlorophenyl)tetrahydro-3-oxo-4-thiophenecarboxylic acid ethyl ester is used for the next stage without further purification.

What is claimed is:

1. The compound, which is 3-hydroxy-2-(4-methoxyphenyl)-4-thiophenecarboxylic acid ethyl ester.
2. The compound, which is 2-(4-chlorophenyl)-3-hydroxy-4-thiophenecarboxylic acid ethyl ester.
3. The compound, which is 2-(4-fluorophenyl)-3-hydroxy-4-thiophenecarboxylic acid ethyl ester.
4. The compound, which is 2-(3-chlorophenyl)-3-hydroxy-4-thiophenecarboxylic acid ethyl ester.

* * * * *